INVENTORS
WALTER WRIGLEY
CHARLES S. DRAPER
BY
ATTORNEYS

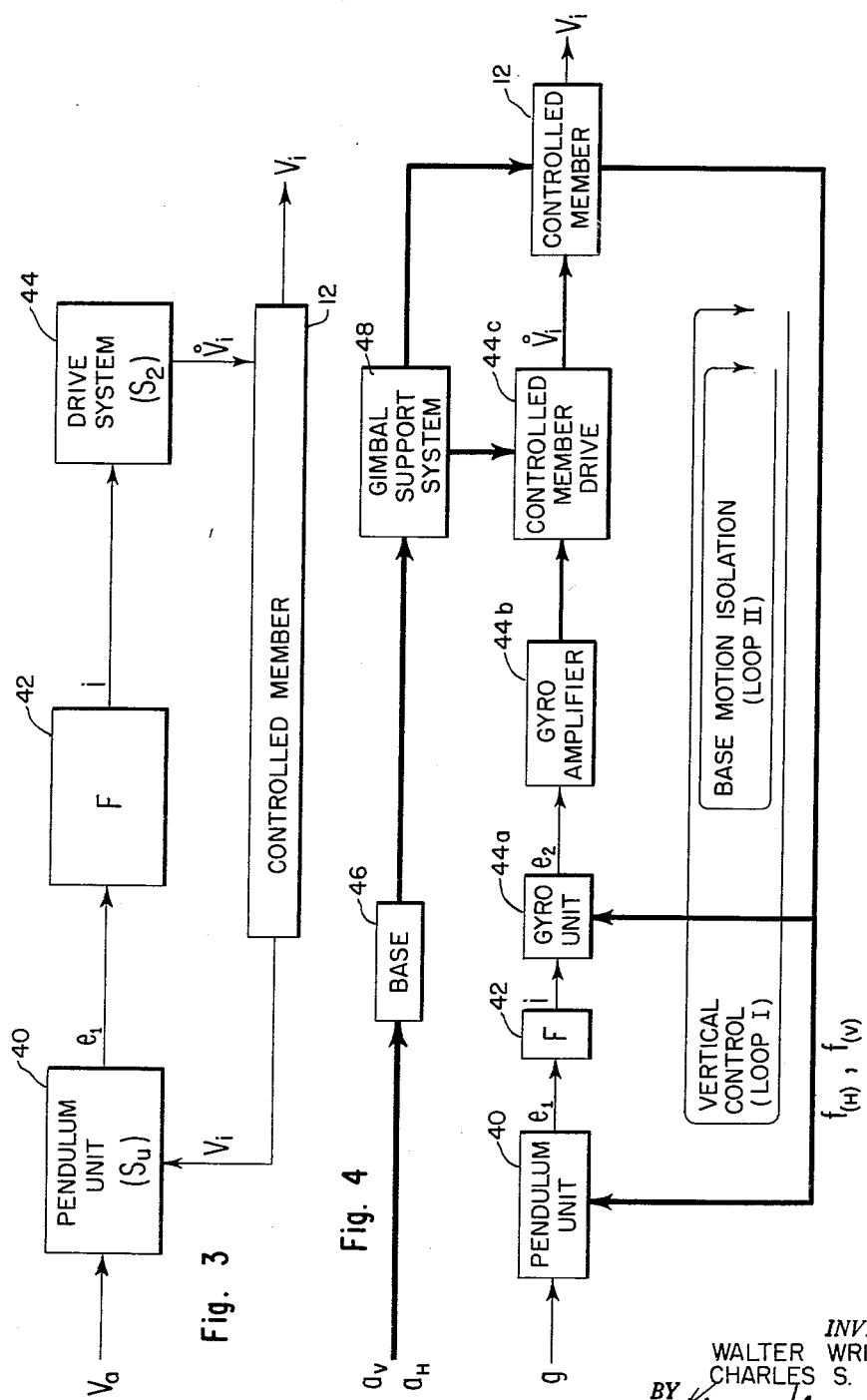

Jan. 9, 1962 W. WRIGLEY ETAL 3,015,962
METHOD AND APPARATUS FOR INDICATING THE VERTICAL
Filed Nov. 30, 1955 6 Sheets-Sheet 3

INVENTORS
WALTER WRIGLEY
CHARLES S. DRAPER
BY
ATTORNEYS

INVENTORS
WALTER WRIGLEY
CHARLES S. DRAPER
BY *Kenway Jenney*
*Walter H...*
ATTORNEYS

United States Patent Office 3,015,962
Patented Jan. 9, 1962

3,015,962
METHOD AND APPARATUS FOR
INDICATING THE VERTICAL
Walter Wrigley, Wollaston, and Charles S. Draper, Newton, Mass., assignors, by mesne assignments, to Research Corporation, New York, N.Y., a corporation of New York
Filed Nov. 30, 1955, Ser. No. 549,917
7 Claims. (Cl. 74—5.47)

The present invention relates to a method and apparatus for indicating the vertical and more particularly to a method and apparatus for obtaining modified Schuler pendulum characteristics. This application is a continuation-in-part of our copending application Serial No. 249,182, filed September 21, 1951, now abandoned.

It becomes important in fire control, navigational and guidance systems for aircraft, ships and missiles to obtain an accurate indication of the vertical. The most convenient method of doing this is to determine the direction of the gravity force vector, and this is most easily done by means of a pendulum, which, if its supporting point is fixed, will hang in such a way that the line between its center of mass and support point will indicate the vertical. However, such an indication is essentially an indication of the acceleration force of gravity on the pendulum, the pendulum acting as a detector of accelerations. Consequently, if the support point is accelerated (which is generally the case if the pendulum is mounted on an aircraft, ship or missile) the pendulum will also detect that acceleration, and the line between its pivot and center of mass will tend to indicate the resultant acceleration and will, in general, be deflected from the true vertical. It has been found theoretically that, if certain critical adjustments are made in the natural frequency of the pendulum, the pendulum will indicate true vertical regardless of accelerations of its support. (See Schuler, M., "Die Störung von Pendel und Kreiselapparaten durch die Beschleunigung der Fahrzeuges," Physikalische Zeitschrift, Band 24, 1932.) However, the theoretical pendulum required by Schuler's theory is not physically feasible. Recent research has shown that an effective pendulum with Schuler characteristics (called an equivalent Schuler pendulum) can be made by mounting a short-period pendulum on a servo-controlled member and activating the servos by a signal representing the doubly-integrated angular deflection of the pendulum with respect to the controlled member. It has been thought that the vertical is best indicated by such an equivalent Schuler pendulum built as accurately as possible. However, there are sources of error in a practical system (primarily sources such as non-ideal components or incorrect initial condition information). They cause errors which at best persist throughout the system's operation and may increase under certain conditions.

It is therefore, one object of our invention to provide a method and apparatus for indicating the vertical which will give greater accuracy than has heretofore been possible. It is another object of our invention to provide a method and apparatus to minimize the errors inherent in an equivalent Schuler pendulum.

In furtherance of the foregoing and other objects as will hereinafter appear, a feature of the present invention is a method and apparatus for introducing damping, or smoothing, into the equivalent Schuler pendulum system. The presence of damping in the system will cause initial errors to decrease in time so that after the system has reached steady-state operation they will have disappeared or been satisfactorily decreased, depending on the amount of damping used. However, the presence of damping will introduce other types of errors. It is therefore a principal feature of our invention that the amount of damping and the method of damping are such that the gain due to reduction of incorrect boundary matching and to smoothing is greater than the loss due to forced dynamic errors. Such a system we call herein a modified Schuler pendulum.

Another feature of the present invention is the combination of the modified Schuler pendulum with gyro stabilization systems such as those described in the copending applications No. 216,946 of Draper, Woodbury & Hutzenlaub and No. 216,947 of Draper and Woodbury to stabilize a member to the vertical, now Patent Nos. 2,752,793 and 2,752,792, respectively.

In the accompanying drawings which show several preferred embodiments of our invention.

FIGS. 3, 4 and 5 are successively expanded block diagrams of such a system constructed according to the present invention;

The present invention will be discussed in the following way. First, the principles of the theoretical Schuler pendulum will be developed (using FIG. 1) to show how such a pendulum can give an indication of the vertical in which there are no errors due to linear accelerations. Second, it will be shown how an equivalent pendulum is made which has the characteristics of the physically impractical Schuler pendulum. In the discussion of the equivalent Schuler pendulum, FIGS. 2, 3 and 7 will be referred to. Third, the basic principles of the present invention (called the modified Schuler pendulum) will be developed, referring to FIGS. 3 and 7. Fourth, a preferred computer configuration for achieving modified Schuler characteristics will be explained in connection with FIG. 5. Fifth, it will be shown how the present invention can be adapted to include a controlled gyro-servo loop to form a vertical stabilizing system. Reference will be made primarily to FIGS. 4 and 6.

THE SCHULER PENDULUM

Figure 1:
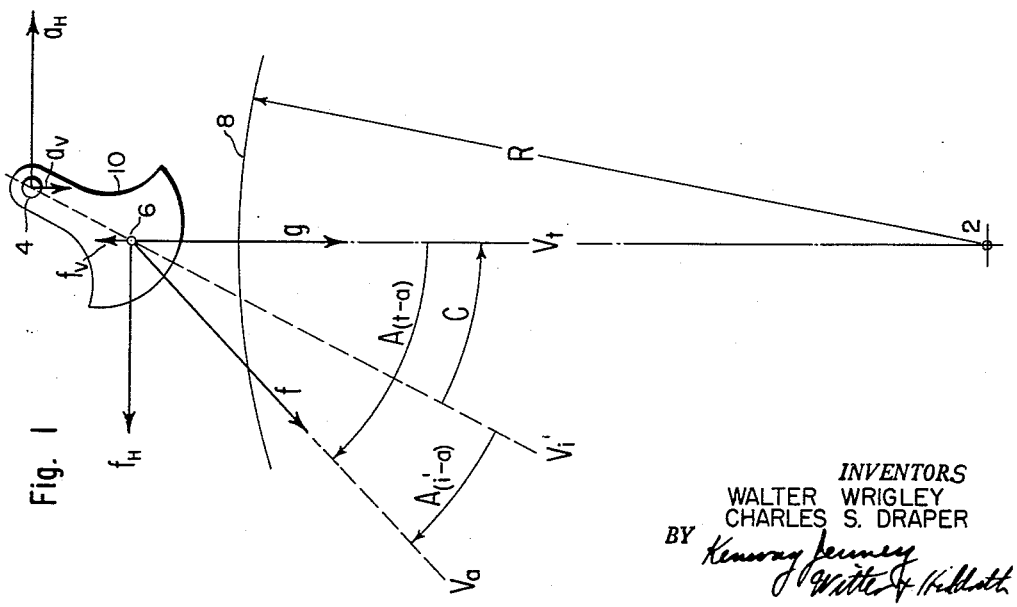
FIG. 1 is an explanatory diagram showing the forces acting on a pendulum whose support is accelerated.

In FIG. 1, a physical pendulum is shown with the forces acting on it when it is mounted in an accelerating vehicle, such as an aircraft. The surface of the earth is indicated at 8, with its center at 2 and radius R which is the symbol representing the earth's radius in the equations below. The pendulum is shown as a mass 10, supported on a pivot 4 with its center of gravity at 6. It is to be understood that the pendulum is constrained to rotate only in the plane of the drawing and therefore, only forces acting in that plane are considered. The pendulum pivot 4, attached to the accelerating aircraft, is being accelerated in the horizontal and vertical directions, indicated by the arrows $a_H$ and $a_V$ respectively. As a result of this acceleration there are inertia reaction forces acting at the center of mass 6 of the pendulum. These are indicated by the arrows $f_H$ and $f_V$. These are conveniently considered as specific forces (that is, forces per unit mass) in each case, and they therefore have the dimensions of accelerations. Also acting on the pendulum is the specific force of gravity represented by $g$. The resultant of these forces is the vector $f$. At $V_t$ is shown the direction of the true vertical. To an observer in the aircraft, however, the vertical will appear to be along the apparent vertical $V_a$, which is the direction of the resultant of the forces of gravity and the reaction to the acceleration which tends to deflect the pendulum from the true vertical. The line of the pendulum which will indicate vertical is the line from its support point 4 to its center of mass 6, $V'_1$ (indicated vertical of the pendulum mass). Except for transient conditions, $V'_1$ and $V_a$ will correspond. That is, the pendulum 10 will line itself up with the direction of resultant force on it, which is the apparent vertical. The vertical indicated by the axis of the pendulum ($V'_1$) will then be colinear with $V_a$. For purposes of generality, FIG. 1 shows the pendumulm in a transient position in which it is not lined up with the apparent vertical. The symbol A represents angles and the angles between the true vertical and apparent vertical and between the indicated vertical and apparent vertical are shown at $A_{(t-a)}$ and $A_{(1'-a)}$ respectively. The symbol C represents the correction to the indicated vertical, namely, the angle from the indicated vertical to the true vertical, i.e., C is the negative of the error in the indication of the vertical, and is so used throughout this specification.

The conditions for Schuler tuning of the pendulum of FIG. 1 will now be shown. Letting $m$ equal the mass of the pendulum, $r$ its radius of gyration, and L the pivot-to-center-of-mass separation (1) $\quad mr^2\ \ddot{V}'_1 = mLf \sin A_{(1'-a)}$ This equation represents Newton's law of motion applied to the pendulum of FIG. 1. The right-hand side of the equation represents the net torque acting on the pendulum about its pivot and the left-hand side is the rate of change of angular momentum of the pendulum. (In this specification a dot over a quantity will indicate its first derivative with respect to time, two dots its second derivative, and so forth. In other words the operator $(\cdot)$ represents the operator $$\left(\frac{d}{dt}\right)$$

Thus $\ddot{V}'_1$ is the angular acceleration of the line representing the indicated vertical.

It will appear from FIG. 1 that (2) $\quad V'_1 = V_t - C$ (3) $\sin A_{(1'-a)} = \sin C \cos A_{(t-a)} + \cos C \sin A_{(t-a)} \cong C \cos A_{(t-a)} + \sin A_{(t-a)}$ since C is a small angle.

(4) $\quad \sin A_{(t-a)} = \dfrac{f_H}{f}$ (5) $\quad \cos A_{(t-a)} = \dfrac{g-f_V}{f}$ Equation 1 may therefore be written:

(6) $\quad \ddot{V}_t - \ddot{C} = \dfrac{Lf}{r^2}\left[C\left(\dfrac{g-f_V}{f}\right) + \dfrac{f_H}{f}\right]$ The term $f_V$ is the centripetal acceleration of the vehicle; in navigation under so-called "level flight," even at very high speeds, this term is negligible in comparison with gravitational acceleration. $f_H$ is the forward acceleration of the vehicle and is:

(7) $\quad f_H = R\ddot{V}_t$

Therefore (6) becomes:

(8) $\quad \ddot{C} + \dfrac{L}{r^2}Cg = \left[1 - \dfrac{L}{r^2}R\right]\ddot{V}_t$ This is the differential equation of motion for the pendulum, showing the relation between the error angle C and the acceleration $\ddot{V}_t$ of the vehicle. The right-hand side can be made zero by setting (9) $\quad \dfrac{L}{r^2} = \dfrac{1}{R}$ in which case the differential equation reduces to

(10) $\quad \ddot{C} + \dfrac{g}{R}C = 0$

This is the condition of Schuler tuning. The solution for the pendulum error angle is

(11) $\quad C = C_0 \cos \sqrt{\dfrac{g}{R}}$

In other words, it is the equation of a simple, undamped pendulum ($C_0$ being its initial deflection and assuming there is no initial rate of change of deflection) with a period of 84.6 minutes. It should be noted that there will be no forced deflection resulting from accelerations of the vehicle. C will be zero if the pendulum is initially set exactly to the vertical. If it is not, the pendulum will oscillate with a period of 84.6 minutes and an amplitude equal to its initial deflection. This is one source of inherent error in any Schuler pendulum system. It will be shown below how this disadvantage in the Schuler characteristics is minimized by the present invention.

The condition of $$\dfrac{L}{r^2} \text{ equal to } \dfrac{1}{R}$$

prescribed by the above equations is physically unrealizable in a true pendulum. In a simple (concentrated mass) pendulum with its support at the earth's surface the pendulum bob would have to be at a distance from the pivot equal to the earth's radius. If the bob were to be maintained at the earth's surface the pivot would have to be an infinite distance from the earth's surface. In a physical (distributed mass) pendulum, the pivot-to-center-of-mass separation would have to be four-billionths of an inch for a radius of gyration of one inch.

THE EQUIVALENT SCHULER PENDULUM

In an effort to provide Schuler characteristics with realizable equipment, it has previously been proposed to use closed-loop systems in which a suitable pendulum, or accelerometer, is used to provide specific force data, and a servomechanism is utilized to actuate a platform (or other "controlled member") in accordance with such data properly modified. Such apparatus is called an equivalent Schuler pendulum and is shown in schematic form in FIGS. 2, 3 and 7. A brief analysis of the equivalent Schuler pendulum will be given as an aid to the understanding of the present invention, which is called a modified Schuler pendulum.

Figure 2:
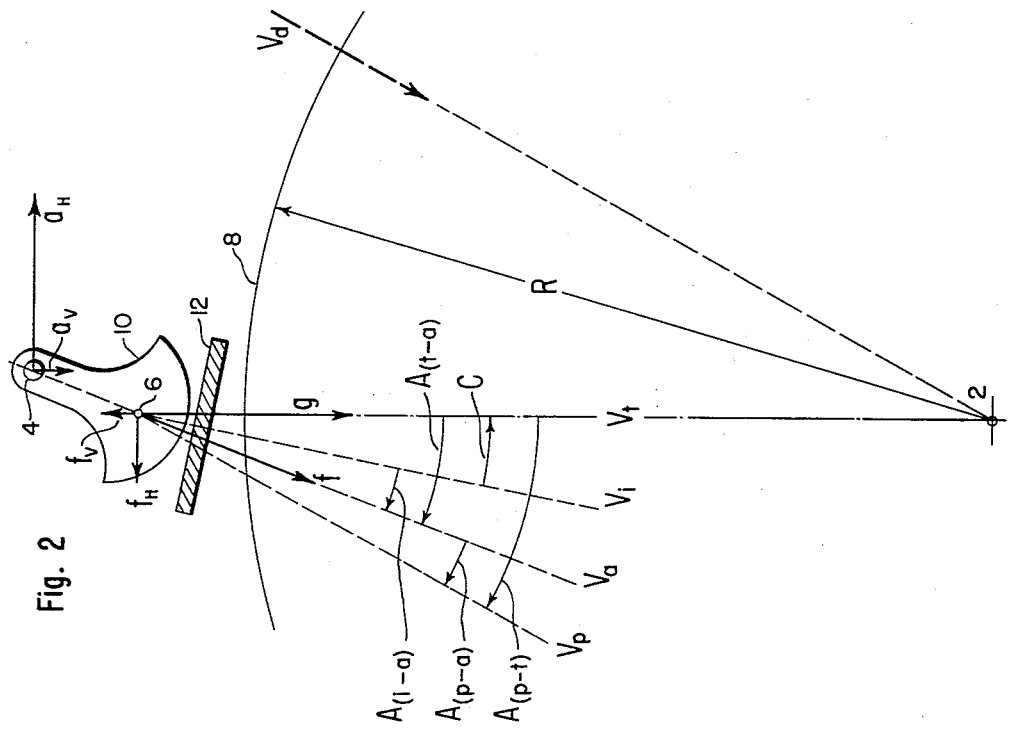
FIG. 2 is an explanatory diagram showing the forces and directions associated with a vertical-indicating system.

FIG. 2 is the same as FIG. 1 except that the controlled member 12 has been added. Also it is assumed that a "steady state" has been reached, so that the vertical $V'_1$ indicated by the pendulum axis is aligned with the apparent vertical. As before, $V_t$ and $V_a$ are respectively the true vertical and the apparent vertical. The axis of the controlled member is $V_1$; this corresponds to the $V'_1$ of FIG. 1 in that it is the vertical indicated by the system.

The equivalent Schuler pendulum may be looked at in two ways. The first is to consider it the physical equivalent of the physically impractical Schuler pendulum. That is, the controlled member 12 is made into an effective pendulum, essentially responding to gravity and accelerations because it is actuated by data from the pendulum 10, but by its servo system given the 84.6 minute period of the unrealizable earth's radius pendulum.

The other way of looking at the equivalent Schuler pendulum is to consider the pendulum 10 as a detector of accelerations and the circuits associated with the controlled member 12 as integrators of those accelerations. To move from rest at one point, A, to another point, B, it is necessary to accelerate. The double integral of these accelerations is proportional to the distance from A to B. By using appropriate sensitivities in integrating, the geocentric angle between A and B can be obtained by double integration. Thus, if the controlled member 12 is horizontal at point A, and if it is rotated through the geocentric angle between A and B as the vehicle carrying it moves from A to B, the controlled member 12 will be horizontal at point B. Thus, the controlled member 12 is made to act like a Schuler pendulum.

Figure 7:
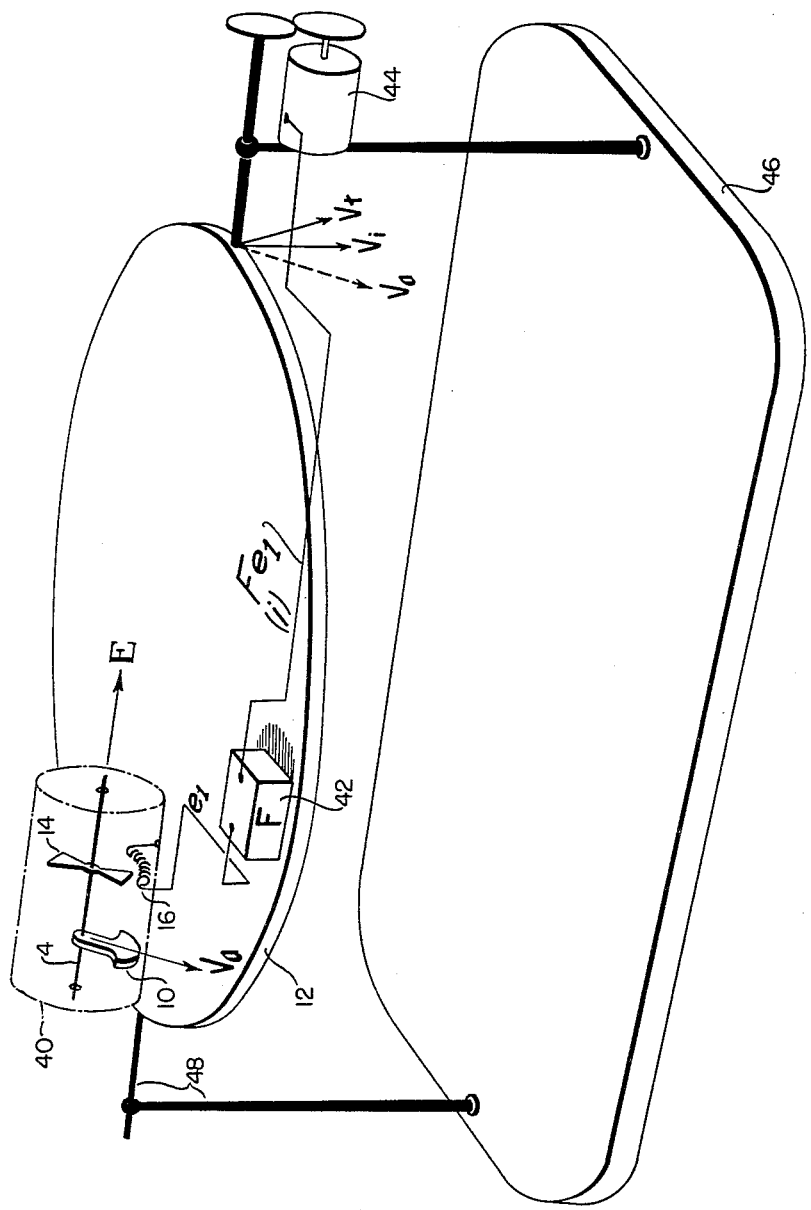
FIG. 7 is a schematic drawing showing a physical configuration appropriate to a vertical-indicating system.

FIG. 7 is a schematic diagram of the physical configuration of pendulum, controlled member and drive system which make up the equivalent Schuler pendulum. (It will be shown below, under the heading "Modified Schuler Pendulum" what changes are made in the arrangement of FIG. 7 to make the present invention.)

The pendulous mass is shown at 10, mounted in the pendulum unit 40 on the controlled member 12. The mass 10 is rigidly attached to the rod 4 which rotates in bearings in the case of the unit; thus the pendulous mass has only one degree of rotational freedom. Also mounted on the rod 4 and the case is a signal generator indicated by its rotor 14 on the rod and its stator windings 16 on the case. The signal generator, when activated by a reference voltage, produces a signal proportional to the angle between the rotor 14 and its null position with respect to the stator windings 16. Thus the signal generator measures the angle between the pendulous mass and its neutral position with respect to the case and controlled member 12. If the components are arranged properly, this is the angle between $V_a$ (the apparent vertical, shown by the pendulum 10) and $V_i$ (the vertical indicated by the controlled member 12), which has been denoted $A_{(i-a)}$.

The output signal, denoted $e_1$ and proportional to $A_{(i-a)}$, is passed through a function-generating network 42, which produces a current $i$. This current may also be designated $Fe_1$, where $F$ is the transfer function of the network 42. The current $i$ is used to activate the servo 44 to move the controlled member 12 with an angular velocity $V_1$ proportional to the current $i$ or $Fe_1$.

It will be seen that the function generator 42 controls the way in which the member 12 responds to deflections of the pendulum mass 10. If the function-generator 42 is simply an amplifier the member 12 will swing back and forth with the pendulum. If, however, integrators of a certain sensitivity are included in the network 42, the member 12 can be made to behave like an 84-minute pendulum and to indicate true vertical. It will now be shown what configuration of the network 42 will produce this result.

FIG. 3 is a simplified block diagram of the servo of FIG. 7 of which the pendulum 10 is a part. The pendulum unit is shown at 40. Its input data are the direction of apparent vertical $V_a$ and the direction of indicated vertical $V_i$. The pendulum will deflect by an angle $A_{(i-a)}$ about its pivot which is fixed to the controlled member 12 as shown in FIGS. 2 and 7. The signal generating means in the pendulum unit generates a voltage $e_1$ proportional to this angle, the constant of proportionality being $S_u$, the sensitivity of the pendulum unit. This voltage output is passed through an electrical network indicated at 42 which modifies the input signal $e$ to give an output signal $i$. Hence

(12) $$i = Fe_1$$

where $F$ is the "transfer function" of the network. The output current $i$ is passed to a driving system shown at 44, which moves the controlled member 12 at a rate proportional to its input. The velocity of such motion is proportional to the current input $i$ to the gyro unit, the proportionality being $S_2$, the sensitivity of the driving system. Motion of the controlled member is really motion of the indicated vertical which is normal to the controlled member, and hence

(13) $$\dot{V}_1 = S_2 i$$

and therefore

(14) $$\dot{V}_1 = S_2 F S_u A_{(i-a)}$$

The angle $A_{(i-a)}$ equals $C$ plus the angle $A_{(t-a)}$. Let

(15) $$A_{(t-a)} = \frac{-f_H}{g} = \frac{R\ddot{V}_t}{g}$$

This approximation assumes that the apparent vertical will not differ from the true vertical by more than a few degrees. This, in general, may not be true. However, accelerations which will cause $A_{(t-a)}$ to be large will be of short duration and since the pendulum detector will itself be damped (so as to give a response time of the order of 15 seconds), they will not seriously affect the system. The long-period accelerations of the order of 84 minutes or more will generally be small enough to warrant the assumption of Equation 15. The ultimate justification is that the approximation has been found to work out in practice.

The angle $C$ equals the angle between $V_i$ and $V_t$, and its rate of change is the difference between their rates of change:

(16) $$\dot{C} = \dot{V}_t - \dot{V}_1$$

Consolidating the above equations,

(17) $$\dot{C} = \dot{V}_t - S_u F S_2 \left[ C + \frac{R\ddot{V}_t}{g} \right]$$

This may be rewritten

(18) $$\dot{C} + S_u F S_2 C = \dot{V}_t - S_u F S_2 \frac{R\ddot{V}_t}{g}$$

Equation 18 is similar to Equation 10 in that it expresses the error of the system indication of vertical in terms of motion of the true vertical, i.e. motion of the vehicle carrying the pendulum.

To make an equivalent Schuler pendulum from the system of FIGS. 3 and 7, the right-hand side of Equation 18 must be set equal to zero. The quantities which can be varied are the various sensitivities and the function generated by the electric components 42. For the first step in the Schuler tuning, let

(19) $$F = S_3 \frac{1}{p}$$

where $S_3$ is a sensitivity and $p$ is the operator $$\frac{d}{dt}$$

$$\frac{1}{p}$$

meaning the integral with respect to time and $p$ meaning the derivative with respect to time. Substituting Equation 19 and using dot notation, the derivative of Equation 18 can be written

(20) $$\ddot{C} + S_u S_2 S_3 C = \left[ 1 - S_u S_2 S_3 \frac{R}{g} \right] \ddot{V}_t$$

The form of this equation is now like that of Equation 10 and Schuler tuning can be established by setting

(21) $$S_u S_2 S_3 = \frac{g}{R}$$

The solution of Equation 20 is now given by Equation 11, assuming similar initial conditions. The system of FIG. 3 has been given Schuler pendulum characteristics; its equation of motion is the same as that of the Schuler pendulum. The apparatus is as shown in FIGS. 3 and 7, with the function generator 42 comprising simply two integrators in series, having a combined sensitivity of $S_3$ (see Eq. 21). Although the apparatus can be built, it has some of the defects of the theoretical Schuler pendulum in that errors in initial alignment will persist or may increase and also in that the system is insensitive to a disturbance with a period of 84.6 minutes.

Other approaches have been to try to build and align the system of FIG. 3 as accurately as possible and eliminate the above errors in that way. However, the accuracy required from the components of the system becomes prohibitive, and the system is extremely expensive and delicate.

THE MODIFIED SCHULER PENDULUM

According to the present invention, we have reduced the effect of the above errors without increasing the accuracy required of the components by adding a special type of damping to the system. (This damping may take slightly different forms depending on the use to which the system will be put, but the principle is the same.) This specially damped equivalent Schuler pendulum, we call a modified Schuler pendulum.

The purpose of introducing damping is to decrease with time the above errors due to imperfect instrumentation and incorrect initial conditions. However, this reduction introduces a delay in achieving a solution and a forced dynamic error. Damping attenuates the high-frequency response of the system, causing the system to delay in reacting to sudden changes of the input. Furthermore, if the input continuously changes rapidly enough, but not suddenly, so that the output-input relationship is a function of the change, the delaying action leads to a forced dynamic error. The present invention in part consists of applying damping in such a way that the forced dynamic error introduced is less than the errors from non-ideal components and faulty initial conditions, so that the net error is decreased.

The damping to achieve the modified Schuler pendulum characteristics is introduced electrically in the function generator 42. Therefore the pictorial view of FIG. 6 and the block diagram of FIG. 3 serve also as drawings for the modified Schuler pendulum. The configuration of the function generator or indication computer 42 for the modified Schuler pendulum is shown in detail in FIG. 5 and will be discussed below.

Damping in the present invention is accomplished by combining the primary signal with a quadrature signal. For example, when the primary signal is undergoing integration, providing a by-pass will put in a quadrature component, effectively adding unintegrated signal to the integrated output. However, such damping attenuates the high-frequency response of the system, causing a forced dynamic error if the disturbance function is short-period. An alternative way of introducing damping is to feed back some of the integrated primary signal to the input of the integrator stage. However, this type of damping attenuates the low-frequency response of the system.

Therefore, the present invention uses a damping function of the type $$\frac{a_1 p + a_0}{p + b_0}$$

combined with an integration so that the electrical components 42 produce a function

(22) $$F = \frac{a_1 p + a_0}{p + b_0} \frac{1}{p}$$

Substituting this function in Equation 18,

(23) $$\ddot{C} + b_0 \ddot{C} + S_u S_2 a_1 \dot{C} + S_u S_2 a_0 C = \left(1 - S_u S_2 a_1 \frac{R}{g}\right) \ddot{V}_t + \left(b_0 - S_u S_2 a_0 \frac{R}{g}\right) \dot{V}_t$$

The left-hand side of Equation 23 is the equation of motion of a damped pendulum with deflection C. The right-hand side of Equation 23 represents the errors introduced by the damping. The effect of damping is to make the terms describing C into a third-order differential equation. This will be discussed more fully below. The condition for Schuler tuning (in Equation 18) was to make the right-hand side of the equation zero. To do that in Equation 23 would nullify the effect of the damping, causing the left-hand side to become the equation for an undamped Schuler pendulum. The condition for modified Schuler tuning is to make either term of the right-hand side of the equation zero. The first term of the right-hand side represents a disturbance dependent on the rate of change of the acceleration of the vehicle, a "jerk" error. The second term represents a disturbance dependent on the acceleration of the vehicle, like the right-hand side of Equation 21. Only one of these may be eliminated and retain both Schuler tuning and damping.

If the second term is eliminated, the chief source of error will be the third derivative of the vehicle motion. This means that high-frequency components of that motion will be the chief source of error. The damping, however, is effective in eliminating low-frequency errors, the errors with a period long compared with 84 minutes, resulting from the non-ideal components. Furthermore, the amount of errors with such a low frequency is very small. Therefore, the term in Equation 23 which should be eliminated is the term with high frequency errors, the third derivative term.

This is done by setting

(24) $$S_u S_2 a_1 = \frac{g}{R}$$

Equation 23 may now be written:

(25) $$\ddot{C} + b_0 \ddot{C} + \frac{g}{R} \dot{C} + \frac{a_0}{a_1} \frac{g}{R} C = \left(b_0 - \frac{a_0}{a_1}\right) \ddot{V}_t$$

The cubic in the left-hand side of Equation 25 may be represented by the following term (where $p$ is the differential operator $$\frac{d}{dt}$$

(26) $$\left(p + \frac{1}{T}\right)(p^2 + 2\zeta \omega_n p + \omega_n^2) C$$

The second factor of the term (26) is the transfer function of a damped pendulum where $\omega_n$ is the natural frequency and $\zeta$, the damping coefficient; the first factor is an exponential decay of time constant T about which the pendulum oscillates. T is the time constant of the decay; $\omega_n$ is the natural frequency of the pendulum; $\zeta$ is the damping coefficient of the pendulum oscillations. By comparing the left side of Equation 25 with the term (26) it can be shown:

(27) $$b_0 = 2\zeta \omega_n + \frac{1}{T}$$

(28) $$\frac{a_0}{a_1} = \frac{R}{g} \frac{\omega_n^2}{T}$$

The three possible variables are $a_0$, $a_1$ and $b_0$. The value of $a_1$ has already been set by the conditions for modified Schuler tuning (see Equation 24). From Equations 27 and 28 the values of the remaining two constants can be set. They are determined by the effective time constant desired for the system, and their optimum values will vary with the system and the use to which it will be put. The three determining conditions are: Schuler tuning ($a_1$), the normal operating frequency range of disturbances $$\left(\frac{1}{T} \text{ and } \omega_n\right)$$

and the minimum error ($\zeta$). Equations 27 and 28, once $$a_1, \frac{1}{T}, \omega_n \text{ and } \zeta$$

are fixed, can be used to determine the desired values of $a_0$ and $b_0$. Once $a_1$, $a_0$ and $b_0$ are determined, the system constants for the computer 42 may be determined. As verification of the above derivation, it can readily be seen that if $a_0$ and $b_0$ are made zero, Equation 25 reduces to the equation for an equivalent Schuler pendulum corresponding to Equation 19:

(30) $$F = a_1 \frac{1}{p}$$

In short, an equivalent Schuler pendulum is made by integrating the output of a physically realizable pendulum twice, with appropriate sensitivities and using the result to move an indicating member. The present invention is a modified Schuler pendulum which is an improvement over the equivalent Schuler pendulum in that it reduces the errors inherent in the equivalent system. It is made by introducing damping of the specified type into the integration process. This specified damping causes the errors inherent in the equivalent system to decrease with time, and the errors it introduces are less than the decrease in inherent errors so that the modified Schuler pendulum represents a net decrease in error over the equivalent Schuler pendulum.

THE INDICATION COMPUTER

Figure 5:
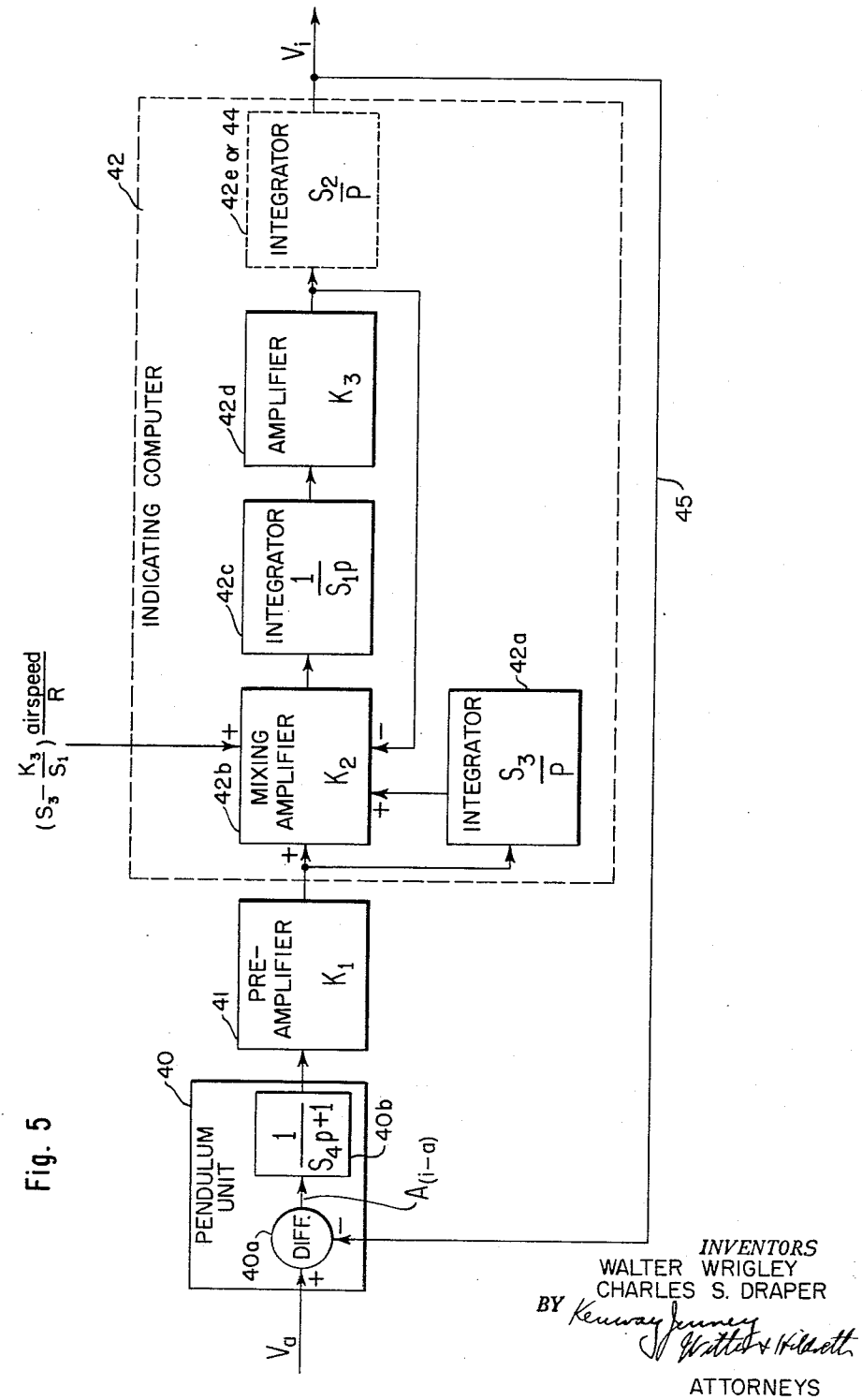
Figure 6:
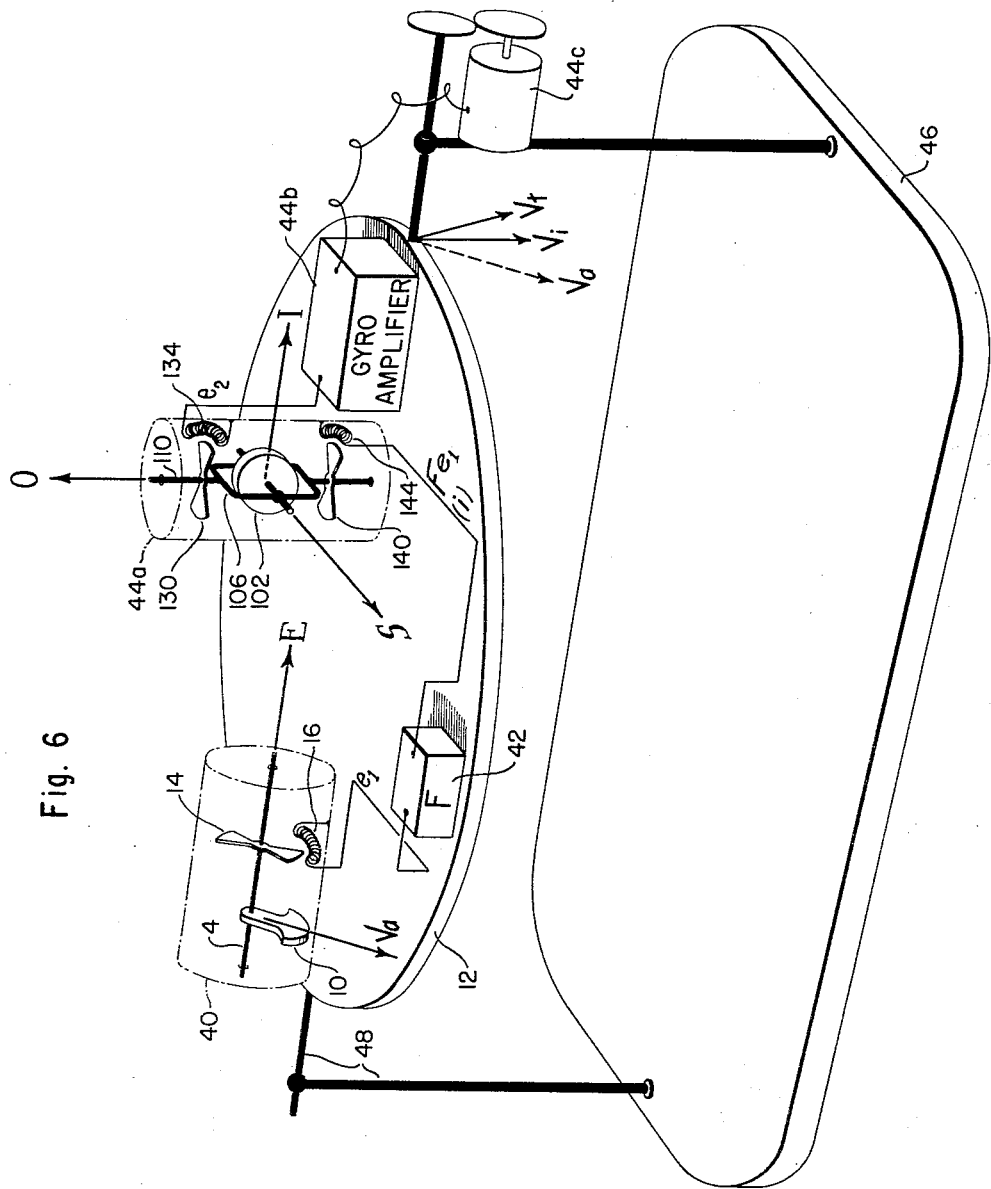
FIG. 6 is a schematic drawing showing a physical configuration appropriate to a vertical stabilization system.

The apparatus for so integrating and damping is shown in detail in block diagram form in FIG. 5. The pendulum unit is indicated at 40. This preferably is a unit of the type described in the copending application of Jarosh and Picardi, Serial No. 222,792, filed April 25, 1951, but any pendulum or accelerometer will in general suffice. The pendulum, as shown in FIG. 3, acts as a detector of the difference between the indicated vertical and the apparent vertical. This operation is indicated by the circle 40a. As can be seen in FIG. 7, the output of the pendulum unit 40 (taken from the signal generator 14 and 16) is proportional to the deflection between the mass 10 and the unit's case on which the windings 16 are mounted. Since the case is fixed to the member 12, its position represents $V_i$ and, as shown above, the pendulous mass is sensitive to the direction of apparent vertical $V_a$. The directions $V_i$ and $V_a$, for the purposes of explanation may be considered as angles from the true vertical $V_t$ so that the two inputs to the pendulum unit 40 are $A_{(t-i)}$ and $A_{(t-a)}$ respectively. When steady-state conditions are reached within the pendulum unit 40, the mass-to-case deflection and the signal output represent $A_{(i-a)}$.

However, the pendulum represented by 40a will have damping associated with it which will further modify the pendulum output. This is indicated by the box 40b which modifies the pendulum output by a function $$\frac{1}{S_4 p + 1}$$

(where $p$ is the operator $\frac{d}{dt}$)

This is tantamount to saying the output is multiplied by an exponential decay $\epsilon^{-t/S_4}$ where $S_4$ is the time constant. In general, the time constant of this pendulum damping will be of the order of a few seconds and therefore negligible in the total period of the loop. The delay is the time it takes the mass 10 to line itself up with $V_a$, that is, to make $V_i'$ (FIG. 1) colinear with $V_a$. The level of the pendulum unit output is raised by a constant $K_1$ by the preamplifier 41.

The indicating computer 42 performs the integration and damping necessary to achieve the modified Schuler pendulum. The integrator 42a and amplifier 42b provide an integration and the first stage of damping by means of a direct channel and, in parallel, an integrating channel, corresponding to a function $$K_2 \frac{p + S_2}{p}$$

The amplifier 42b, integrator 42c and amplifier 42d provide the second stage of damping, consisting of an internal feedback loop, corresponding to a function $$\frac{K_3}{S_1 p + K_3}$$

The second integration is provided by the integrator 42e, which may be the drive system 44 for the controlled member 12, as will be further explained below. The effect of the introduction of an airspeed correction in the amplifier 42b will be discussed at the end of the specification. The output of the pendulum mass itself (40a) is $A_{(i-a)}$ and the operations performed by the succeeding apparatus can be designated as follows:

(31) $$\left[\frac{1}{S_4 p + 1}\right] (K_1 K_2 K_3) \left[\frac{p + S_2}{S p + K_3}\right] \left(\frac{1}{p}\right) \left(\frac{S_2}{p}\right) A_{(i-a)}$$

where $p$ is the operator $$\frac{d}{dt}$$

and $K_1$, $K_2$, $K_3$, $S_1$, $S_2$, $S_3$, and $S_4$ various constants of the system.

The variable of Expression 31 is $A_{(i-a)}$, the angle between the indicated vertical and the apparent vertical, that is, the angle between the normal to the controlled member and the direction of the resultant force on the pendulum mass. This is the physical input to the system. It is not necessarily the angle at which the pendulum hangs. If a step function of acceleration were applied to the system, the pendulum would tend toward the new direction of resultant force and damping would reduce the angular difference to zero after a time. Therefore, the effect of the pendulum characteristics is indicated by the next term, $$\left[\frac{1}{S_4 p + 1}\right]$$

It is contemplated that the damping will be large enough so that the inertia forces the pendulum mass will be negligibly small; their presence would alter this term by introducing in its denominator a term in $p^2$. The time constant of this pendulum damping will be in general of the order of a few seconds and therefore the effect of the transient caused thereby will be negligible in the 84-minute period of the entire system. The next terms of Expression 31 are constants of the system. The term $$\left[\frac{p + S_2}{S_1 p + K_3}\right]$$

is the damping term introduced by the computer system. This is the critical term in the Expression 31 and the S and K constants of the system must be adjusted to each particular range indicating system to balance the errors introduced by this damping term and the errors removed by it to get as large a decrease in total error as possible as described above. No definite rule can be prescribed for this operation but it will be apparent to those skilled in the art that trial-and-error experimentation may be used or a calculation based on the expected conditions of acceleration and velocity, by the techniques indicated above. The determining conditions are: Schuler tuning, the normal operating frequency range of disturbances, and the minimum error.

The overall effect of the components (42a–d) is to produce a damping term $$\left[\frac{p + S_2}{S_1 p + K_3}\right]$$

and one stage of integration $$\left(\frac{1}{p}\right)$$

This is the special term of (22). The next term $$\left(\frac{S_2}{p}\right)$$

is an integration obtained from the integrator 42e. Considering all but this last stage of integration the Expression 31 parallels that prescribed by Equation 22 for modified Schuler pendulum characteristics. However, the derivation of Equation 22 assumed that a stage of integration would be provided by the driving means 44 of FIG. 3. As shown by Equation 13, this was based on the assumption that the driving means would rotate the member 12 at a velocity proportional to the drive means input, as shown in FIG. 7, so that the position of the member 12 represented the integral of that input. If such is the case then only one $$\left(\frac{1}{p}\right)$$

term need be provided by the indicating computer 42 and it comes from the integrator 42a. For that reason the integrator 42e is shown by dotted lines in FIG. 5. If, however, the system is not like that of FIGS. 3 or 7, but is a system in which the drive means 44 rotates the member 12 through an angle proportional to its input, then an integrator 42e must be provided to supply the stage of integration assumed in Equation 12.

At this point, further modifications of the present invention should be noted. First, although the present invention has been discussed in terms of pendulums, it is to be understood that accelerometers may also be used. The quantity the pendulum detects is the direction of the apparent vertical $V_a$, that is, the direction of the resultant sum of the gravity force and the inertia reaction forces on its bob. This input may be thought of as the angle between indicated vertical and apparent vertical $A_{(i-a)}$. Then the output of the pendulum unit is proportional to $A_{(i-a)}$ or $[C+A_{(t-a)}]$ and in the computer 42 it is effectively multiplied by $g/R$ (see Equation 21) to give for the second term the quantity $\ddot{V}_t$, the angular acceleration of true vertical, which is the real quantity which is integrated and damped to determine the total angle through which the true vertical has moved. An accelerometer, instead of determining the direction of the resultant of the gravity and acceleration force, determines the amount of acceleration force along the X-axis of the member which may be denoted $a_x$. Making the assumptions of Equation 15, $a_x$ will equal $\ddot{X}+gC$. Then, if an accelerometer is used, the system multiplies its output not by $g/R$ as in Equation 21, but by $1/R$, to obtain $\ddot{V}_t$ and $gC/R$ on which the system operates.

However, whether a pendulum or accelerometer is used, it is best mounted on the member it is positioning. Then, the Schuler tuning does two things. First, it nulls out gravity terms (long-period accelerations) in the data, which represent orientations of the member off horizontal. Second, it operates on the acceleration terms so as to move the member at the proper rate to keep it horizontal as the vehicle moves over the earth.

Conceivably, however, it may be desirable to use some other member for the horizontal mounting. If such a modification were made, it would be necessary to provide a feedback means to retain the existing feedback represented by the arrow 45. In such a case, the integrator 42e could be entirely electric and the output signal representing $V_i$ could be electric. There are many methods of feedback, which will be apparent to one skilled in the art. As an example, a torque generator (like the torque generator 140 and 144 of FIG. 6) might be provided in the pendulum unit, as in the above-mentioned copending application No. 222,792 of Jarosh et al. An electric feedback from the integrator 42e could be used to introduce a torque proportional to $A_{(t-i)}$ on the shaft 4. The mass 10 would still pick up the acceleration torque and the shaft 4 would act as the torque-differencing or summing member 40a (FIG. 5). The net torque and thus the direction to which the pendulum would hang would then be proportional to $A_{(i-a)}$, and thus the pendulum unit output would represent $A_{(i-a)}$ as in FIG. 5. Such an embodiment of the present invention may be impractical, but is included here to show that the integrator 42e of FIG. 5 need not always be a drive 44 and member 12 (FIG. 3), but may be a purely electric integrator.

The electrical components of FIG. 5 are standard components well known to those skilled in the art. We have obtained precise results with our invention by the use of motor-tachometer-generator integrators, but other types, as for example, an electronic or gyroscopic integrator, could be used. Similarly, we have obtained greatest accuracy with a pendulum unit of the type described in the copending application of Jarosh and Picardi, but any other type, such as a conventional accelerometer, might be used with appropriate changes in the system as described above. The amplifiers of FIG. 5 may be of any conventional type.

The present invention has been discussed in terms of a first-order damping function $$\frac{ap+b}{p+c}$$

It will be understood that higher-order damping functions may be used if desired, that is, damping functions having transfer functions of the following general form:

(32)
$$\frac{a_n p^n + a_{n-1} p^{n-1} + \ldots + a_0}{a^1{}_n p^n + a^1{}_{n-1} p^{n-1} + \ldots + a^1{}_0}$$

Such functions may be obtained by concatenating computing apparatus like that shown in FIG. 5 (42 a—d). The conditions for Schuler tuning under such circumstances will be worked out as above, selecting constants so that the error terms are cancelled out of the equation.

THE VERTICAL STABILIZATION SYSTEM

Another form of the present invention is the application of the above method of indicating the vertical to an apparatus for stabilizing a controlled member to the vertical. Such an embodiment incorporates a controlled gyro-servo loop for the drive means 44 of FIGS. 3 and 7. Such an embodiment is shown schematically in FIGS. 4 and 6.

FIG. 6 shows the pendulous mass 10 mounted on the controlled member 12. The function generator 42 activates a driving system 44a, 44b and 44c. For merely indicating the vertical, it may be enough that the driving system include means for moving the controlled member as in FIGS. 3 and 7. If, however, the vertical-indicating system is to be mounted in a moving vehicle, as is normally the case, it is desirable to include in the system means for isolating the controlled member from rotational movement of its vehicle: the driving system must both drive the member and geometrically stabilize it.

The configuration shown in FIGS. 4 and 6 is such a vertical indicating and stabilizing system. It represents a combination of the modified Schuler pendulum with the stabilization system described in the copending application of Draper and Woodbury, filed March 22, 1951, Serial No. 216,947, now Patent No. 2,752,792. In such a system two loops are provided: the first, a stabilization loop in which a gyro detects motion and activates drives to nullify the effect of the motion on the controlled member and second, a control loop in which a torque is applied to the gyro so that the drives cause the controlled member to rotate with a desired reference axis.

FIG. 6 shows an indicating member 12, mounted in bearings 48 on a base member 46 which may be the vehicle within which it is desired to indicate the vertical. The member 12 carries a pendulum unit 40, a function generator 42 (although this unit need not be mounted on the indicating member), a single-degree-of-freedom gyroscope 44a, an amplifier 44b, and a servo 44c for moving the member 12.

As was explained above in connection with FIG. 3, the pendulum unit 40 produces an electric signal output $e_1$ which is proportional to $A_{(1-a)}$. $e_1$ is acted upon by the function network 42 to produce $Fe_1$ or $i$ which is used to actuate the driving system 44, which moves the controlled member 12 at a rate $\dot{V}_1$ proportional to its input. This drive system was denoted in FIG. 3 by the block 44, and in FIG. 7 by the servo 44. In FIGS. 4 and 6 it is shown that this drive system may conveniently be made up of three components, a gyro unit 44a, an amplifier 44b and a servo drive 44c, so as to introduce short period stabilization, and so as to perform the integration indicated by the block 42e of FIG. 5.

The gyro unit 44a is preferably of the type described in the copending application No. 210,246 of Jarosh, Haskell and Dunnell, filed February 9, 1951, now Patent No. 2,752,791. As such, the gyro unit 44a includes a single-degree-of-freedom gyro, a signal generator, and a torque generator. The single-degree-of-freedom gyro comprises a gyro rotor 102 mounted to spin in a frame 106 which is in turn mounted on a shaft 110, which is free to rotate about the output axis O. In such a gyro, rotation of the unit about the input axis I (perpendicular to the spin and output axes) causes an output rotation of the frame 106 and shaft 110 about the output axis O. This input axis is parallel to the pendulum input axis E. Output rotations are resisted by a viscous damping or other means causing the amount of the output rotation to be proportional to the amount of the input rotation.

A signal generator (shown by its rotor 130 and stator windings 134 is provided in the gyro unit, like the one in the pendulum unit, and it produces an output voltage $e_2$ proportional to the output rotation and therefore, proportional to the input rotation. This output signal is amplified by the amplifier 44b and used to activate the servo drive 44c to move the controlled member 12 so as to null the gyro deflection. Thus any motion of the controlled member 12 from its initial position about the input axis I is immediately nulled, and the controlled member 12 is stabilized about the axis I.

Torque generating means are also included in the gyro unit so a control torque can be applied to it. This is shown by the rotor 140 and stator windings 144, attached to the shaft 110 and case respectively. This causes a torque tending to rotate the shaft 110, which is proportional to the current input $i$ to the torque generator. Since the action of the drive 44c is such as to keep the shaft 110 fixed in the gyro case, the torque from the torque generator must be balanced by a gyrostatic torque on the shaft coming from the gyro rotor reaction to the motion of the controlled member 12.

An angular velocity $\dot{V}_1$ of the controlled member produces an output torque on the shaft 110 proportional to $\dot{V}_1$; the torque from the torque generator is proportional to $i$; $i$ is proportional to the velocity of the true vertical $\dot{V}_t$ as determined by the modified Schuler pendulum components 40 and 42. Thus, by setting the proportionalities correctly $\dot{V}_1$ is made equal to $\dot{V}_t$ and the controlled member is made to follow the vertical continuously. This control effected by the torque generator in no way changes the stabilization effected by the gyro element itself. The two act together in superposition, so that the motion of the member 12 driven by the servo 44c has two components: stabilization of the member 12 in its initial position against motion of the base 46 and a slow change of the initial position in response to inputs to the torque generator.

It should be noted that the gyro unit 44a, amplifier 44b and driver 44c act as an integrator of the input current $i$. $i$ is proportional to a desired angular velocity $\dot{V}_1$ and the end result of the drive system is an angular position $V_1$ of the controlled member 12.

FIG. 4 is a block diagram of the vertical stabilization system, showing the electrical and mechanical interrelation of its components. It is in essence an expansion of FIG. 3, since the vertical stabilization apparatus of FIG. 4 is a vertical-indicating system like FIG. 3, incorporating in the drive system 44 of FIG. 3 a stabilizing loop. In FIG. 4 heavy lines are used to indicate rigid mechanical connections, medium lines for power-level connections and light lines for signal-level connections. Strictly speaking, FIGS. 4 and 6 show apparatus for stabilization about one axis only; however, apparatus for stabilizing about another axis is identical in everything except physical orientation. Stabilization about two axes is all that is needed to stabilize about the vertical. The apparatus is mounted on a base 46 which is carried by a vehicle. Therefore one input to the system is the variation of the position of the vehicle, its horizontal and vertical accelerations. The controlled member 12 (see FIGS. 4 and 6) is supported by a gimbal support 48. The gimbal system is mounted on the base 46. The controlled member is moved in its gimbal supports by the controlled member drive 44c. The controlled member drive is activated by the output from the gyro amplifier 44b, whose input is the output voltage $e_2$ of the gyro unit 44a.

The gyro unit is controlled by the function generator 42 whose output is the current to the gyro unit $i$. The input to the function generator is the output $e_1$ of the pendulum unit 40. The pendulum unit inputs are the acceleration forces and the gravity forces. It is to be noted that an accelerometer can be used wherever a pendulum has been indicated.

As can be seen from FIG. 4, the apparatus comprises two closed loops. The first (loop I) is the vertical control loop; the second (loop II) is the base motion isolation loop. Two loops are provided in the apparatus because the period of the pendulum is so long that, if the vehicle rolls or pitches, the controlled member will be carried with it. Therefore, means are provided in loop II to isolate the controlled member from motion of the base. Loop II is more fully described below.

To further specify FIGS. 4 and 6, it may be said that the pendulum unit 40 is preferably of the type described in the Jarosh and Picardi Patent No. 2,802,956 and the gyro unit of the type described in the above-mentioned Patent No. 2,752,791 of Jarosh, Haskell and Dunnell. The two-loop construction of FIG. 4 is of the general type described in the above-mentioned patent of Draper and Woodbury No. 2,752,792 but using as detectors of deviations from a reference axis, means for producing signals representing accelerations normal to the vertical (such as the pendulum unit 40) and means for modifying such signals (the function generator 42) as described in this specification. The configuration of the function generator 42 which provides the integration and damping taught by the present invention is shown in more detail in FIG. 5 and has been described above.

Referring to FIG. 4, the operation of loop I is to control the orientation about the input axis of the gyro at which the controlled member 12 is stabilized by loop II so that it is always vertical and thereby causes the controlled member 12 to be held by loop II to the vertical. The orientation of the output axis of the gyro is controlled, in this embodiment of the present invention, by a torque generator as described above. When this generator imposes a control torque about the output axis of the gyro, it causes an infinitesimal deflection of the gyro and therefore a signal $e_2$. The drive 44c then continuously moves the controlled member 12 so as to null the deflection. In this form of the present invention the torque is made proportional to the deflection of the controlled member 12 from true vertical, by means of the modified Schuler pendulum components 40 and 42. The pendulum unit 40 generates a signal $e_1$ proportional to $A_{(1-a)}$ and the function generator 42 modifies that signal to produce $i$ which is proportional to the velocity of deviation from true vertical $\dot{C}$ and the torque generator (140, 144) causes a torque tending to deflect the gyro proportional to $i$. Therefore, loop II stabilizes the controlled member 12 to the vertical about one axis. Two such loops with two pendulums and two gyros are sufficient to stabilize the member to the vertical. A physical configuration showing two such loops will be found in FIG. 4 of the above-mentioned Draper and Woodbury application.

It will be understood that the pendulums shown herein are forms of acceleration-detecting devices, since the angles shown in FIGS. 1 and 2 are determined by the value of the acceleration of the vehicle over the surface of the earth relative to the gravitational acceleration or specific force.

PHYSICAL REALIZATION OF CIRCUITS

The actual components of FIGS. 4, 5 and 6 may be realized in any suitable or convenient manner, as will be recognized by those skilled in the art of control systems or servomechanisms. It is recognized that there may be various ways of physically realizing a stated transfer function, as explained in standard texts on servomechanisms, as for example, Principles of Servomechanisms, Brown and Campbell, published by John Wiley and Sons, Inc., 1948. It is necessary only that a proper combination of integration and damping, as represented by (22) or by integration in combination with the type of damping represented by (32).

Figure 8:
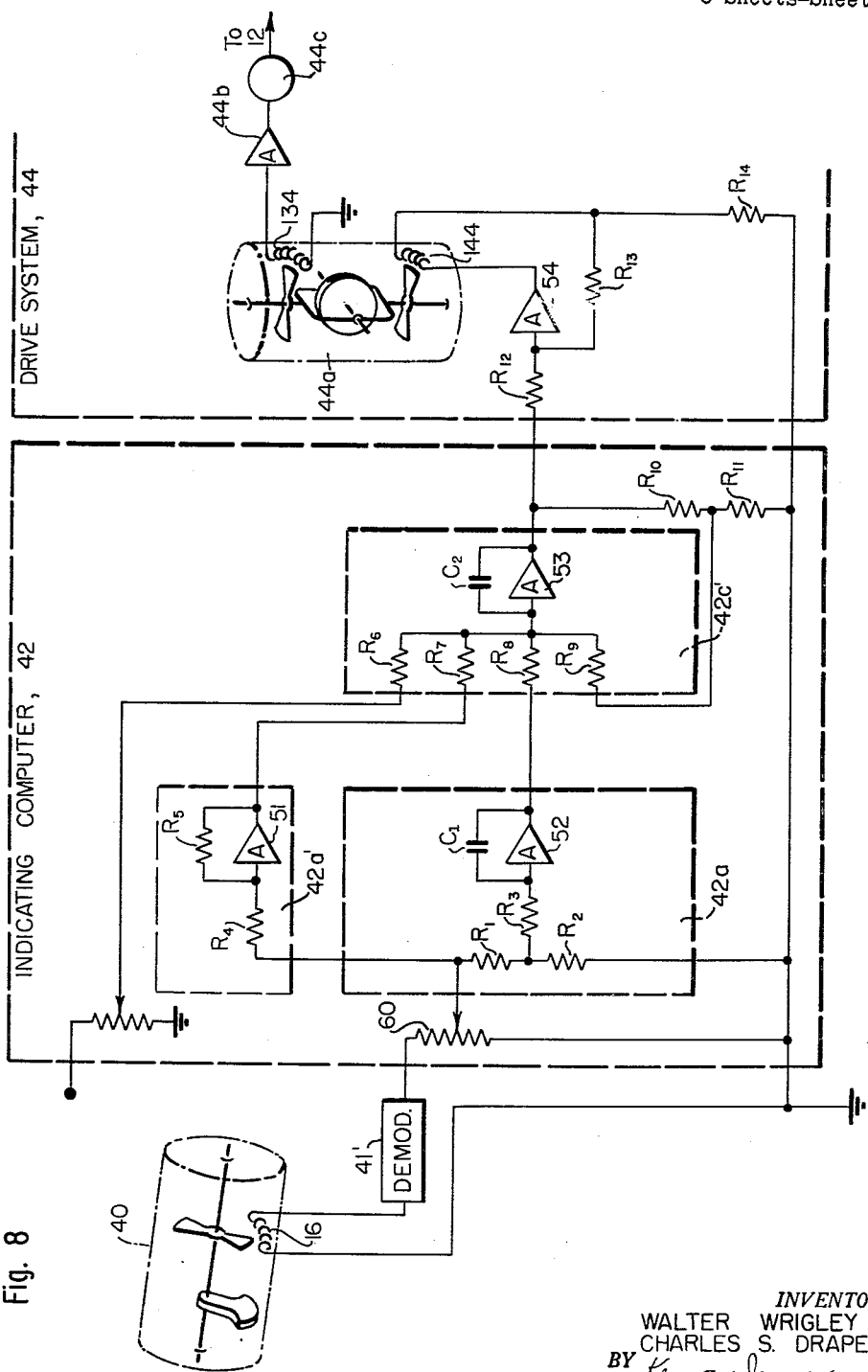
FIG. 8 is a complete diagram of the electrical circuits.

One suitable circuit arrangement is specifically shown in FIG. 8. This circuit gives the same transfer function as that of FIG. 5, but with some slight differences of arrangement, as will be pointed out.

The output of the signal generator 16 of the pendulum unit 40 is passed to a demodulator 41' which serves also as the preamplifier 41 of FIG. 5. Demodulation is introduced because the pendulum unit signal generator uses a 400-cycle reference voltage. The output of the demodulator 41' is a fluctuating D.C. voltage proportional to the instantaneous pendulum deflection. (The block 40b is not included in FIG. 8 because that represents the effect of pendulum damping on the angle A, while FIG. 8 is intended to show only the operation on the actual output from 16.) The demodulated signal is passed through a voltage divider 60. The signal is now ready for the first stage of integration and damping as represented in FIG. 5 by the integrator 42a and by-pass amplifier 42a'. A connection runs from the voltage divider to resistors $R_1$ and $R_2$, from the junction of which a connection runs through resistor $R_3$ to the input of amplifier 52.

The indicating computer 42 is to modify the signal according to Equations 22, 24, 27 and 28, by a function $$F = \frac{a_1 p + a_0}{p + b_0}\left(\frac{1}{p}\right)$$

The first stage of integration and damping comprises the integrator 42a by-passed by the direct channel 42a'. The integrator is formed by coupling a capacitor $C_1$ to the high terminals of the amplifier 52, which is a D.C. amplifier of large gain (in the present embodiment, about $10^5$). In such a case the integrator 42a of FIG. 8 has a transfer function very nearly equal to $$-\frac{1}{pC\left(\frac{R_1 R_3}{R_2}\right)}$$

The direct channel 42a' by-passing the integrator 42a is through the resistors $R_4$ and $R_5$, and the amplifier 51 (which is like amplifier 52, a high-gain D.C. amplifier). The resistors $R_4$ and $R_5$ are preferably made equal, in which case the direct-channel gain is $-1$, and the by-pass amplifier 42a' serves as a phase inverter.

The integrator 42a and direct channel through amplifier 51 have modified the signal by a function $$-\frac{1}{p}\left(p + \frac{a_0}{a_1}\right)$$

The integrator 42c' with its output fed back on its input through the voltage divider $R_{10}$ and $R_{11}$, modifies its input by a function $$-\frac{1}{p + b_0}$$

The resistors $R_6$, $R_7$, $R_8$ and $R_9$ replace the mixing amplifier 42b of FIG. 5. They are preferably all equal. Hence the block 42c' serves the function of 42b, 42c and 42d of FIG. 5.

The transfer function of the feed-back integrator stage based on a high-gain D.C. amplifier 53, is very nearly $$-\frac{\frac{1}{R_7 C_2}}{p + \frac{1}{R_7 C_2}\left(\frac{R_{11}}{R_{10}}\right)};$$

$\frac{1}{R_7 C_2}$ corresponds to $K_3/S_1$ in FIG. 5 and $$\frac{R_{11}}{R_{10}}$$

to the gain of the minus channel of the mixing amplifier 42b of FIG. 5.

The overall gain of the computer 42 is the factor of the voltage divider 60 times the gain $$\frac{1}{R_7 C_2}$$

of the second stage. This overall gain is set equal to $g/R$, or $1.54 \times 10^{-6}$.

The output from the computer 42 is fed to the drive system 44, which includes means for converting the computer output voltage to a suitable current input for the torque generator 144 of the gyro unit 44a. To this end the output voltage is applied to resistors $R_{12}$, $R_{13}$ and $R_{14}$ connected as shown in FIG. 8 to the input of a high gain D.C. amplifier 54. The amplifier output is connected to the winding 144 of the torque generator, and said winding is connected through $R_{13}$ to apply a feed-back voltage to the amplifier 54.

The deflection of the gyro is measured by the signal generator 134, and the generated signal is amplified by the amplifier 44b and applied to the servomotor 44c (FIGS. 6 and 8) to drive the controlled member 12.

Satisfactory values of the parameters are as follows:

$S_u$=Sensitivity of pendulum unit 40 and demodulator 41': 2 volts per minute of pendulum deflection.

$S_2$=Sensitivity of drive system 44: 2 minutes of arc per second per volt input. (Note that $S_2$ is here expressed in terms of voltage input rather than current input.)

$$S_u S_2 a_1 = \frac{g}{R} = 1.54 \times 10^{-6} \text{ sec.}^{-2} = 20 \text{ hr.}^{-2};$$

$$\frac{a_0}{a_1} = 0.641 \text{ hr.}^{-1}$$

$b_0 = 3.26$ hr.$^{-1}$.
$C_1 = 16$ microfarads
$C_2 = 1$ microfarad.
$R_1 = 1$ megohm
$R_2 = 5750$ ohms
$R_3 = 2$ megohms
$R_4 = R_5$
$R_6 = R_7 = R_8 = R_9 = 1$ megohm
$R_{10} = 1$ megohm
$R_{11} = 906$ ohms $R_{12}=R_{13}=1$ megohm
$R_{14}=2255$ ohms It will be understood that the values may be varied over wide limits. It is only necessary that the values of the various circuit elements be chosen to result in the operations set forth in Equations 23 to 28 above.

The actual form of the circuitry may also be varied. For example, in the arrangement herein described, the first stage of integration is effected in 42a, and the damping is introduced through a parallel circuit 42a'. The transfer function of the integration is $$-\frac{1}{pC_1\frac{R_1R_3}{R_2}}$$

and the transfer function of the by-pass is conveniently taken as $-1$. Upon mixing through $R_7$, $R_8$, the result is $$-1-\frac{1}{pC_1\frac{R_1R_3}{R_2}}=-\frac{1}{p}\left(p+\frac{a_0}{a_1}\right)$$

where $$\frac{a_0}{a_1}$$

has been written for $$\frac{R_2}{C_1R_1R_3}$$

In a later stage involving $R_{10}$ and $R_{11}$ the transfer function $$-\frac{1}{p+b_0}$$

is introduced. It is however, possible to use cascaded circuits; for example, the integral circuit may be cascaded with a network having the transfer function $$\frac{a_1p+a_0}{p+b_0}$$

which for the values herein given is a single stage "high-pass" filter. In either case the two stages of integration are attainable by the circuit shown or by other means familiar to the man skilled in the network art.

It is to be emphasized that ideal, or nearly ideal, integrators are desirable, if not absolutely necessary. It is possible to substitute for either integrator a passive network, but such a network will give "undercompensated" integration, with a transfer function of the form $$\frac{1}{p+c} \text{ instead of } \frac{1}{p}$$

In such a case (22) would become $$F=\frac{a_1p+a_0}{p^2+(b_0+c)p+b_0c}$$

and upon substitution of this function into (18) it would be found that the right side of the equation would have a term in $\dot{V}_t$. In other words, there would be a forced error proportional to groundspeed. By a suitable choice of parameters the error may be kept small, and it is within the purview of the invention to use "integration" with passive networks, but it is preferred to use true integration (with damping) in order that the groundspeed error may be eliminated.

As heretofore stated, it is preferred to choose the parameters in (23) to zeroize the term in $\ddot{V}_t$, since it is not possible to zeroize both $\ddot{V}_t$ and $\dot{V}_t$ and still retain damping. The retention of the term in $\dot{V}_t$ results in a forced error proportional to acceleration. It can be shown, however, that the forced error is negligible for the high frequency terms that are involved in the transients accompanying ordinary motions and maneuvers of air or surface craft.

The more complex damping functions represented by (32) may be used, if desired. Actually, any such expression may be factored into an expression like $$\frac{(a_1p+a_0)\ldots}{(p+b_0)\ldots}$$

where the dots represent additional network stages of similar form, and hence the expression for the single stage indicates the requirements with full generality. Additional stages of damping have been found unnecessary for satisfactory operation.

*Airspeed correction*

One further ramification remains to be explained. When the vertical-indicating apparatus is used in an aircraft, the system accuracy may be considerably increased by the introduction of an airspeed correction. Generally speaking, the error-causing input to the system is the essentially geocentric angular acceleration of the aircraft with respect to the ground, $\ddot{V}_t$. This has two components, an airspeed term (velocity of plane in air) and a wind term (velocity of air to earth). The airspeed term is measurable; the wind term is not. A substantial change in airspeed is commensurate with a very large wind term, so that, if the system need not handle the airspeed term, the overall error is reduced roughly by a factor of two.

The method of correcting for changes in airspeed is to measure the airspeed by outside means (for example, a conventional airspeed indicator) and introduce a term in the computer stage to cancel out the airspeed sensed by the acceleration detector or pendulum unit. The correct airspeed term is obtained from Equation 25. It will be seen that the right-hand side of Equation 25 is the error-forcing term, proportional to $\ddot{V}_t$. Subtracting from that term, a term which is $$\left(b_0-\frac{a_0}{a_1}\right)$$

times the airspeed measured as a geocentric angle reduces the forced errors substantially. The desired term is therefore:

$$\left(b_0-\frac{a_0}{a_1}\right)\frac{\text{airspeed}}{R}$$

The best place to introduce such a term is in the computer 42 (FIG. 5) and more specifically, in the mixing amplifier 42b. (At that point, the error-forcing term has been integrated once, so that it is proportional to velocity like the airspeed, and not acceleration).

It is necessary to reduce the expression $$\left(b_0-\frac{a_0}{a_1}\right)$$

to the S and K constants of the computer 42 and this is done by comparing the damping expression $$\frac{a_1p+a_0}{p+b_0}$$

with the performance function of the network of FIG. 5, that is, Expression 31. It can then be shown that the airspeed term to be added is:

$$\left(S_3-\frac{K_3}{S_1}\right)\frac{\text{airspeed}}{R}$$

as shown in FIG. 5. The airspeed may be generated from a conventional airspeed indicator and the proportionalities introduced by means of an amplifier.

Throughout the above description no account has been taken of the effects of ellipticity of the earth or of the rotation of the earth. It can be shown analytically that even for very accurate work, the effect of the ellipticity of the earth can be made negligible. However, earth's rotation causes Coriolis terms to appear in the above analysis which are not negligible where the work is very accurate. These terms will appear as an acceleration which will cause an error term in the deflection of the pendulum or accelerometer. They may be compensated for by appropriate subtractions at the computation stage. The Coriolis term will be proportional to the sine of the latitude and the speed of the vehicle. The latitude may be obtained by pendulums mounted on a member which is fixed to intertial space as described in the copending application of Draper, Wrigley, Woodbury and Hutzenlaub, Serial No. 303,242 filed August 8, 1952, or may be pre-set for a desired course. Considerable flexibility is possible because there are no requirements for great accuracy, since the term being computed is an error term.

*Conclusion*

As shown in a paper entitled "Schuler Tuning Characteristics in Navigational Instruments" by Walter Wrigley, published in Navigation, vol. 2, No. 8, December 1950, Schuler tuning has long been recognized as desirable to avoid errors due to accelerations of the vehicle. The conventional gyrocompass has allowed Schuler tuning to be realized. However, so far as we are aware, Schuler tuning has never been practically realized in gyropendulums, or in fact, in any equipment for indicating the vertical, and the Wrigley paper shows that 84-minute tuning is "marginal" in the conventional gyropendulum, since the separation between the pivot and the center of mass for a gyro-pendulum with a one-inch radius of gyration and spinning at 500 r.p.s. would have to be $\frac{1}{100}$ inch.

According to the present invention, it is possible to provide a stable vertical with Schuler tuning characteristics. This is done with acceleration-detecting devices and single-degree-of-freedom gyros, together with drive connections operating on the controlled member in such a way as to null any deflections of the acceleration-detecting devices and gyros. Such an instrument, with the parameters chosen as described herein to give substantially an 84-minute period, is capable of substantially maintaining the vertical even under accelerations accompanying maneuvers of air or surface craft. It is to be noted that while Schuler tuning may be realized, to the extent of attaining an 84-minute period with so-called equivalent Schuler tuning, the present invention involves modified Schuler tuning, in which damping is present, since without the effect of damping any disturbance of the indicating mechanism would persist as an 84-minute oscillation of undiminished amplitude. The damping effect is necessary to cause the mechanism to settle down.

Having thus described the invention, we claim:

1. Apparatus for indicating the vertical in one plane, including a controlled member, a single-degree-of-freedom pendulum mounted on the member so as to swing in the plane, means to convert angular deflections of the pendulum with respect to the member to an electrical signal, means for integrating said electrical signal twice with respect to time, means for damping said integration, and means for moving said member through an angle proportional to the result of said integration and damping, said integrating and damping means having parameters to provide a period substantially that of an earth-radius pendulum.

2. Apparatus for indicating the vertical comprising a controlled member, an acceleration-detecting device on the controlled member and responsive to gravity, a single-degree-of-freedom gyroscope mounted on the controlled member and sensitive to rotational deflections of the controlled member about an axis having a horizontal component, a signal generator actuated by deflections of the acceleration-detecting device, torque connections between said signal generator and the gyroscope, drive means and connections therefor actuated by deflections of the gyroscope relative to the controlled member to move the controlled member in a direction to null the gyroscope deflections, integrating means in said torque connections, and a circuit in parallel with said integrating means to provide damping for the signals, the integrating means having parameters to provide a period substantially that of an earth-radius pendulum.

3. Apparatus for indicating the vertical comprising a controlled member, an acceleration-detecting device on the controlled member and responsive to gravity, a single-degree-of-freedom gyroscope mounted on the controlled member and sensitive to rotational deflections of the controlled member about an axis having a horizontal component, signal means actuated by deflections of the acceleration-detecting device, a torque generator for the gyroscope, connections from said signal means to the torque generator, said connections including means for integrating and damping the signal, a signal generator for the gyroscope, a drive system including the gyroscope and drive means for the controlled member, and connections from the signal generator of the gyroscope to the drive means, said drive system constituting a second stage of integration, the integrating and damping means having parameters to provide a period substantially that of an earth-radius pendulum.

4. Apparatus for indicating the vertical in a vehicle moving through a fluid medium comprising a controlled member, an acceleration-detecting device on the controlled member and responsive to gravity, a single-degree-of-freedom gyroscope mounted on the controlled member and sensitive to rotational deflections of the controlled member about an axis having a horizontal component, the gyroscope having provision for deflections relative to the controlled member, a signal generator actuated by deflections of the acceleration-detecting device, torque connections between said signal generator and the gyroscope, and including integrating and damping means, a drive system including the gyroscope and drive means for the controlled member, a signal generator on the gyroscope, and connections from the signal generator to the drive means to rotate the controlled member about said axis in a direction to null the gyroscope deflections, said drive system constituting a second stage of integration, the integrating and damping means having parameters to provide a period substantially that of an earth-radius pendulum.

5. Apparatus for indicating the vertical comprising a controlled member, an acceleration-detecting device on the controlled member and responsive to gravity, a single-degree-of-freedom gyroscope mounted on the controlled member and sensitive to rotational deflections of the controlled member about an axis having a horizontal component, a signal generator actuated by deflections of the acceleration-detecting device, torque connections between said signal generator and the gyroscope, a drive system including the gyroscope together with drive means actuated by deflections of the gyroscope relative to the controlled member to move the controlled member in a direction to null the gyroscope deflections, and signal-modifying means to introduce integration and damping into said torque connections, said drive system constituting a second stage of integration, said signal-modifying means and drive system having parameters to provide a period substantially that of an earth-radius pendulum.

6. Apparatus for indicating the vertical in a vehicle moving through a fluid medium comprising a controlled member, an acceleration-detecting device on the controlled member and responsive to gravity, a single-degree-of-freedom gyroscope mounted on the controlled member and sensitive to rotational deflections of the controlled member about an axis having a horizontal component, a signal generator actuated by deflections of the acceleration-detecting device, torque connections between said signal generator and the gyroscope, a drive system including the gyroscope together with drive means actuated by deflections of the gyroscope relative to the controlled member to move the controlled member in a direction to null the gyroscope deflections, and signal-modifying means to introduce integration and damping into said torque connections, said drive system constituting a second stage of integration, said signal-modifying means including damping means and having parameters to provide a period substantially that of an earth-radius pendulum, and means for introducing a signal proportional to the speed of the vehicle through the fluid medium to be acted upon by the damping means.

7. Apparatus for indicating the vertical in a vehicle moving through a fluid medium comprising a controlled member, an acceleration-detecting device on the controlled member and responsive to gravity, a single-degree-of-freedom gyroscope mounted on the controlled member and sensitive to rotational deflections of the controlled member about an axis having a horizontal component, a signal generator actuated by deflections of the acceleration-detecting device, torque connections between said signal generator and the gyroscope, a drive system including the gyroscope together with drive means actuated by deflections of the gyroscope relative to the controlled member to move the controlled member in a direction to null the gyroscope deflections, and signal-modifying means including integrating and damping means to introduce integration and damping into said torque connections, the damping means comprising a circuit in parallel with the integrating means, the drive system constituting a second stage of integration and means for generating a compensating signal from the speed of the vehicle through the fluid medium, means for introducing the compensating signal to be acted on by the damping means, the integrating and damping means having parameters to provide a period substantially that of an earth-radius pendulum.

References Cited in the file of this patent

UNITED STATES PATENTS

| | | |
|---|---|---|
| 1,480,637 | Schuler | Jan. 15, 1924 |
| 2,591,697 | Hays | Apr. 8, 1952 |
| 2,598,672 | Braddon | June 3, 1952 |
| 2,608,867 | Kellogg II et al. | Sept. 2, 1952 |
| 2,752,792 | Draper | July 3, 1956 |